United States Patent
Terry

(10) Patent No.: US 9,585,063 B2
(45) Date of Patent: *Feb. 28, 2017

(54) MULTIPLEXING DATA OF A PLURALITY OF CHANNELS

(71) Applicant: InterDigital Technology Corporation, Wilmington, DE (US)

(72) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,863

(22) Filed: Dec. 14, 2015

(65) Prior Publication Data

US 2016/0100333 A1 Apr. 7, 2016

Related U.S. Application Data

(63) Continuation of application No. 14/636,595, filed on Mar. 3, 2015, now Pat. No. 9,215,727, which is a
(Continued)

(51) Int. Cl.
*H04W 72/10* (2009.01)
*H04W 28/10* (2009.01)
(Continued)

(52) U.S. Cl.
CPC ......... *H04W 28/10* (2013.01); *H04L 12/5602* (2013.01); *H04L 47/2458* (2013.01);
(Continued)

(58) Field of Classification Search
CPC ........... H04L 12/5602; H04L 47/2458; H04W 28/14; H04W 28/0215; H04W 28/0263;
(Continued)

(56) References Cited

U.S. PATENT DOCUMENTS 4,630,261 A 12/1986 Irvin
4,677,616 A 6/1987 Franklin
(Continued)

FOREIGN PATENT DOCUMENTS

EP 0430570 6/1991
EP 0707386 4/1996
(Continued)

OTHER PUBLICATIONS

3G TS 25.425 "Technical Specification Group Radio Access Network; UTRAN $I_{ur}$ Interface User Plane Protocols for Common Transport Channel Data Streams", $3^{rd}$ Generation Partnership Project, V3.1.0 (Mar. 2000); Release 1999.
(Continued)

*Primary Examiner* — Omar Ghowrwal
(74) *Attorney, Agent, or Firm* — Volpe and Koenig, P.C.

(57) ABSTRACT

A code division multiple access (CDMA) communication device comprises a medium access controller (MAC) configured to receive data from a plurality of channels. Each channel is associated with a priority and an identifier. The MAC is further configured to multiplex the data of the plurality of channels for transmission over a CDMA channel based on the priority.

14 Claims, 7 Drawing Sheets

Related U.S. Application Data continuation of application No. 14/248,014, filed on Apr. 8, 2014, now Pat. No. 8,989,003, which is a continuation of application No. 12/603,974, filed on Oct. 22, 2009, now Pat. No. 8,711,692, which is a continuation of application No. 10/832,678, filed on Apr. 27, 2004, now Pat. No. 7,609,632, which is a continuation of application No. 09/569,731, filed on May 12, 2000, now Pat. No. 6,738,368.

(51) Int. Cl.
  H04W 72/12    (2009.01)
  H04L 12/54    (2013.01)
  H04W 28/14    (2009.01)
  H04L 12/833   (2013.01)
  H04W 28/02    (2009.01)
  H04W 72/04    (2009.01)

(52) U.S. Cl.
  CPC ... *H04W 28/0215* (2013.01); *H04W 28/0263* (2013.01); *H04W 28/0289* (2013.01); *H04W 28/14* (2013.01); *H04W 72/0406* (2013.01); *H04W 72/0486* (2013.01); *H04W 72/10* (2013.01); *H04W 72/1263* (2013.01)

(58) Field of Classification Search
  CPC ......... H04W 72/0486; H04W 72/1263; H04W 28/10; H04W 72/0406; H04W 72/10
  See application file for complete search history.

(56) References Cited

U.S. PATENT DOCUMENTS

| | | | |
|---|---|---|---|
| 5,278,828 | A | 1/1994 | Chao |
| 5,317,562 | A | 5/1994 | Nardin et al. |
| 5,420,861 | A | 5/1995 | De La Bourdonnaye |
| 5,528,591 | A | 6/1996 | Lauer et al. |
| 5,666,348 | A | 9/1997 | Thornberg et al. |
| 5,729,540 | A | 3/1998 | Wegrzyn |
| 5,742,588 | A | 4/1998 | Thornberg et al. |
| 5,754,541 | A | 5/1998 | Glisic et al. |
| 5,774,453 | A | 6/1998 | Fukano et al. |
| 5,802,310 | A | 9/1998 | Rajaraman |
| 5,828,677 | A | 10/1998 | Sayeed et al. |
| 5,838,677 | A | 11/1998 | Kozaki et al. |
| 5,850,394 | A | 12/1998 | Sekine et al. |
| 5,872,769 | A | 2/1999 | Caldara et al. |
| 6,078,568 | A | 6/2000 | Wright et al. |
| 6,091,725 | A | 7/2000 | Cheriton et al. |
| 6,105,070 | A | 8/2000 | Gaylord |
| 6,122,253 | A | 9/2000 | Jones |
| 6,154,500 | A | 11/2000 | Dorenbosch et al. |
| 6,157,628 | A | 12/2000 | Uebayashi et al. |
| 6,236,646 | B1 | 5/2001 | Beming et al. |
| 6,285,662 | B1 | 9/2001 | Watanabe et al. |
| 6,330,603 | B1 | 12/2001 | Seki et al. |
| 6,418,136 | B1 | 7/2002 | Naor et al. |
| 6,418,477 | B1 | 7/2002 | Verma |
| 6,421,335 | B1 | 7/2002 | Kilkki et al. |
| 6,424,624 | B1 | 7/2002 | Galand et al. |
| 6,490,248 | B1 | 12/2002 | Shimojo |
| 6,496,513 | B1 | 12/2002 | Takamichi |
| 6,507,567 | B1 | 1/2003 | Willars |
| 6,507,572 | B1 | 1/2003 | Kumar et al. |
| 6,567,420 | B1 | 5/2003 | Tiedemann et al. |
| 6,594,238 | B1 | 7/2003 | Wallentin et al. |
| 6,674,765 | B1 | 1/2004 | Chuah et al. |
| 6,765,868 | B1 | 7/2004 | Dunn et al. |
| 9,215,727 | B2 * | 12/2015 | Terry .................. H04L 12/5602 |

FOREIGN PATENT DOCUMENTS

| | | |
|---|---|---|
| EP | 0798943 | 10/1997 |
| EP | 0877512 | 11/1998 |
| EP | 0912015 | 4/1999 |
| EP | 0912015 | 5/1999 |
| EP | 0977393 | 2/2000 |
| JP | 61131940 A2 | 6/1986 |
| JP | 3045051 A2 | 2/1991 |
| JP | H345051 | 2/1991 |
| WO | 9608935 | 3/1996 |
| WO | 9622666 | 7/1996 |
| WO | 9725824 A1 | 7/1997 |
| WO | 9725825 | 7/1997 |
| WO | 9736405 A1 | 10/1997 |
| WO | 9816036 | 4/1998 |
| WO | 9833349 | 7/1998 |
| WO | 9847253 | 10/1998 |
| WO | 9909775 | 2/1999 |

OTHER PUBLICATIONS

Aldama et al, "Outage Effects on the TCP-Wireless Integration for Data/Voice Services in CDMA Systems Using Multiple Access," IEEE 49$^{th}$ Vehicular Technology Conference, May 16-20, 1999, vol. 2. pp. 1717-1721.

Chao et al., "Queue Management with Multiple Delay and Loss Priorities for ATM Switches," IEEE International Conference on Communications, 1994, ICC 94, SUPERCOMM. New Orleans, LA, May 1-5, 1994, vol. 2, pp. 1184-1189.

Liebeherr et al., "Priority Queue Schedulers with Approximate Sorting in Output-Buffered Switches," IEEE Journal on Selected Areas in Communications, Charlottesville, VA, Jun. 1999, vol. 17, Iss. 6, pp. 1127-1144.

Nortel Networks, "CCH and DSCH Procedures over Iur," TSG-RAN Working Group 3 meeting #2, TSGW3#2(99)159, Nynashamn, Sweden (Mar. 15-19, 1999).

Okada et al., "CDMA Unslotted Aloha System with Finite Buffers," IEEE International Universal Personal Communications, Oct. 5-9, 1998, vol. 2, pp. 1143-1147.

Prasad et al., "An Overview of CDMA Evolution toward Wideband CDMA," IEEE Communications Surveys, pp. 2-29 (1998).

Terry, FACH Scheduling, Prioritization and Queue Management, 3GPP TSG-RAN WG2 #4, Berlin, Germany, May 25-28, 1999.

Third Generation Partnership Project, "Technical Specification Group Radio Access Network; UTRAN Iur interface user plane protocols for Common Transport Channel data streams," 3GPP TS 25.425 V0.1.0 (Feb. 1999).

Third Generation Partnership Project, "Technical Specification Group Radio Access Network; Radio Resource Control (RRC); Protocol Specification (Release 1999)," 3GPP TS 25.331 V1.0.0 (Apr. 1999).

Third Generation Partnership Project, "Technical Specification Group Radio Access Network; Radio Resource Control (RRC); Protocol Specification (Release 1999)," 3GPP TS 25.331 V3.2.0 (Mar. 2000).

Third Generation Partnership Project, "Technical Specification Group Radio Access Network; MAC Protocol Specification (Release 1999)," 3GPP TS 25.321 v3.3.0 (Mar. 2000).

Third Generation Partnership Project, "Technical Specification Group Radio Access Network; Radio interface protocol architecture (Release 1999)," 3GPP TS 25.301 V 3.4.0 (Mar. 2000).

Third Generation Partnership Project, "Technical Specification Group Radio Access Network; Radio interface protocol architecture (Release 1999)," 3GPP TS 25.301 V 3.0.0 (Apr. 1999).

Third Generation Partnership Project, "Technical Specification Group Radio Access Network; Radio resource management strategies (Release 1999)," 3GPP TR 25.922 V0.1.1 (Apr. 1999).

Third Generation Partnership Project, "Technical Specification Group Radio Access Network; Radio resource management strategies (Release 1999)," 3GPP TR 25.922 V3.1.0 (Mar. 2000).

Third Generation Partnership Project, "Technical Specification Group Radio Access Network; UTRAN Overall Description (Release 1999)," 3GPP TS 25.401 V1.0.0 (Apr. 1999).

Third Generation Partnership Project, "Technical Specification Group Radio Access Network; UTRAN Overall Description (Release 1999)," 3GPP TS 25.401 V3.2.0 (Mar. 2000).

(56) References Cited

OTHER PUBLICATIONS

Third Generation Partnership Project, "Technical Specification Group Services and System Aspects; QoS Concept and Architecture (Release 1999)," 3G TS 23.107 V3.2.0 (Mar. 2000).
Third Generation Partnership Project, "Technical Specification Group Radio Access Network; UTRAN Iub Interface: General Aspects and Principles (Release 1999)," 3G TS 25.430 V3.1.0 (Mar. 2000).
Third Generation Partnership Project, "Technical Specification Group Radio Access Network; UTRAN Iub Interface NBAP Signalling (Release 1999)," 3G TS 25.433 V3.1.0 (Mar. 2000).
TS 25.321 V2.0.0 (Apr. 1999), "MAC Protocol Specification," $3^{rd}$ Generation Partnership Project (3GPP), Technical Specification Group (TSG) RAN, Working Group 2, 1999.
TS 25.321 V2.0.1 MAC Protocol Specification, TSG-RAN Working Group 2 (Radio Layer 2 and Radio Layer 3), Berlin, Germany, May 25-28, 1999.
TSGR3#3(99)286, "Report of [ARC/1] Study Item 'Common Transport Channels (FACH, RACH, DSCH) on Iur,'" (Draft), TSG-RAN Working Group 3 (Architecture), Kawasaki, Japan, Apr. 26-30, 1999, pp. 1-5.
TSGW3#n(99)395, "Draft LS to RAN 2, Common Channel Management Over Iur," TSG-RAN Working Group 3 Meeting #3, Nortel Networks, Kawasaki, Japan, Apr. 26-30, 1999.
Yang et al., "A Taxonomy for Congestion Control Algorithms in Packet Switching Networks," IEEE Network, Jul./Aug. 1995, pp. 34-45.

\* cited by examiner

FACH Prioritization 72

| Type | Source | Destination | | Class | Suggested Priority |
|---|---|---|---|---|---|
| | | No Iur | Across Iur | | |
| CCCH (Signaling) | RLC | X | X | Mandatory | Medium |
| DCCH (Signaling) | MAC-d | X | X | Best Effort | Medium |
| DTCH (Traffic) | MAC-d | X | X | Best Effort | Low |
| DSCH (Control) | MAC-sh | X | | Mandatory | Highest |
| USCH (Control) | MAC-sh | X | | Mandatory | Highest |
| H-ARQ (Control) | MAC-d | X | X | Mandatory | High |
| H-ARQ (Control) | MAC-sh | X | | Mandatory | Highest |

FIG. 5 ically, the invention relates to a system and method of prioritizing and controlling the flow of data for common and shared channels in a spread spectrum system.

MULTIPLEXING DATA OF A PLURALITY OF CHANNELS

This application is a continuation of U.S. patent application Ser. No. 14/636,595, filed Mar. 3, 2015, which issued on Dec. 15, 2015 as U.S. Pat. No. 9,215,727, which is a continuation of U.S. patent application Ser. No. 14/248,014, filed Apr. 8, 2014, which issued on Mar. 24, 2015 as U.S. Pat. No. 8,989,003, which is a continuation of U.S. patent application Ser. No. 12/603,974 filed on Oct. 22, 2009, which issued on Apr. 29, 2014 as U.S. Pat. No. 8,711,692, which is a continuation of U.S. patent application Ser. No. 10/832,678, filed Apr. 27, 2004, which issued on Oct. 27, 2009 as U.S. Pat. No. 7,609,632, which is a continuation of U.S. patent application Ser. No. 09/569,731, filed May 12, 2000, which issued on May 18, 2004 as U.S. Pat. No. 6,738,368, the contents of which are hereby incorporated by reference herein.

BACKGROUND

The invention generally relates to channels used by multiple users in a wireless code division multiple access spread spectrum system. More specifically, the invention relates to a system and method of prioritizing and controlling the flow of data for common and shared channels in a spread spectrum system.

FIG. 1 illustrates a simplified wireless spread spectrum code division multiple access (CDMA) communication system 18. A node b 26 within the system 18 communicates with associated user equipment 20-24 (UE). The node b 26 has a single site controller (SC) 30 associated with either a single (shown in FIG. 1) or multiple base stations 28. A Group of node bs 26, 32, 34 is connected to a radio network controller (RNC) 36. To transfer communications between RNCs 36-40, an interface between the RNCs (IUR) 42 is utilized. Each RNC 36-40 is connected to a mobile switching center (MSC) 44 which in turn is connected to the core network 46.

To communicate within the system 18, many types of communication channels are used, such as dedicated, shared and common. Dedicated channels transfer data between a node b 26 and a particular UE 20-24. Common and shared channels are used by multiple UEs 20-24 or users. All of these channels carry a variety of data including traffic, control and signaling data.

Since shared and common channels carry data for different users, data is sent using protocol data units (PDUs) or packets. As shown in FIG. 2, to regulate the flow of data from differing sources 48-52 into a channel 56, a controller 54 is used.

One common channel used for transmitting data to the UEs 20-24 is the forward access common channel (FACH) 58. As shown in FIG. 3, the FACH 58 originates in an RNC 36 and is sent to a node b 28-34 for wireless transmission as a spread spectrum signal to the UEs 20-24. The FACH 58 carries several data types from various sources, such as a common control channel (CCCH), dedicated control and traffic channel (DCCH and DTCH), and a downlink and uplink share channel (DSCH and USCH) control signaling. The FACH 58 also carries control signaling out of band, such as hybrid automatic repeat request (H-ARQ), and similar data transmitted via the IUR 62 from other RNCs 38-40, such as CCCH, DCCH, DTCH and H-ARQ control data.

Various controllers are used by the RNC 36 to control the flow of data. A radio link controller (RLC) 64 handles the CCCH. The dedicated medium access controller (MAC-d) 66 handles the DCCH, the DTCH and some out of band H-ARQ signaling. The shared medium access controller (MAC-sh) 68 handles the DSCH, USCH control signaling and out of band H-ARQ control signaling. Controlling the FACH 58 is the common medium access controller (MAC-c) 60.

Due to the multiple sources of data 48-52 that can be transmitted over a common or shared channel, the channel controllers 54 queue the data prior to transmission. If a large backlog develops in the queue, data in the queue develops a latency. A large latency of certain data such as control data will result in the failure of a channel. To alleviate this problem, the prior art either flushed the queue to reduce congestion or rerouted the data. Flushing the queue results in the loss of data and requires retransmission which is undesirable. Rerouting data already queued creates a duplication of data within the system and does not resolve the existing congestion. Accordingly, it is desirable to reduce the latency of data for shared and common channels without the problems associated with the prior art.

SUMMARY

A code division multiple access (CDMA) communication device comprises a medium access controller (MAC) configured to receive data from a plurality of channels. Each channel is associated with a priority and an identifier. The MAC is further configured to multiplex the data of the plurality of channels for transmission over a CDMA channel based on the priority.

BRIEF DESCRIPTION OF THE DRAWINGS

FIG. 5 is a prioritization scheme for use with a FACH channel.

DETAILED DESCRIPTION OF THE PREFERRED EMBODIMENTS

Figure 4:
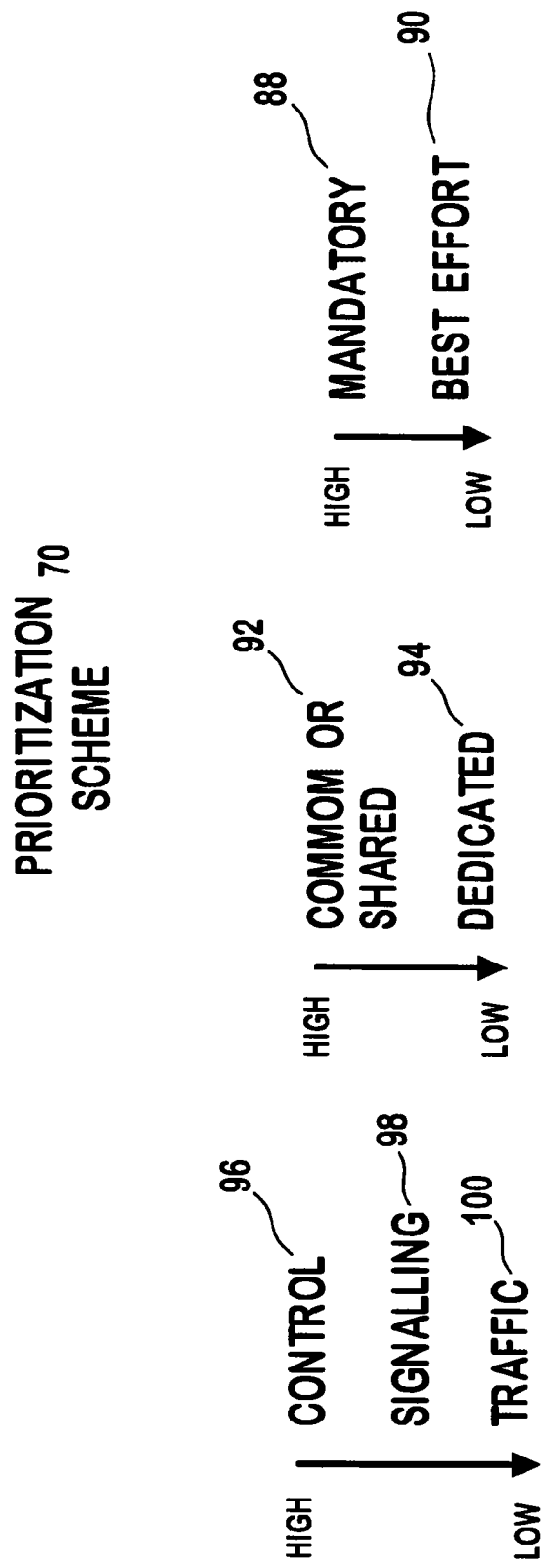
FIG. 4 is an illustration of a prioritization scheme.

Data prioritization 70 is used to reduce data latency in a multiuser channel controller 54 as illustrated in FIG. 4. For a particular common or shared channel, certain data must be transmitted on that channel and is shown in the figure as "mandatory" 88. Other data is preferably sent on the particular channel but may be rerouted to another channel, such as a dedicated channel. This data is referred to as "best effort" 90. Since "mandatory" data 88 is not reroutable, it takes priority over "best effort" data 90.

The type of the data within a packet, such as control 96, signaling 98 and traffic data 100, is also used for prioritization. To accomplish prioritization of the data type, control 96 and signaling 98 data packets are separated from traffic data packets 100. One approach to separating the packets is to group similar data type packets together prior to reception at the controller 54. Alternately, packets sent by each channel prior to reception by the controller 54 are provided with a flag or identifier indicating the packets' data type.

Since a prolonged delay in the transfer of control 96 or signaling 98 data results in a frozen channel, control 96 and signaling 98 data are given a higher priority than traffic data 100. Additionally, data associated with multiple users, common or shared 92, has a higher priority than data for a single user, dedicated 94. The data prioritization scheme is typically stored in the software of the multiuser channel's controller.

During periods of high congestion, data is rerouted to other channels based on its priority 70. For instance, best effort dedicated traffic data is rerouted and mandatory common control data is not. By rerouting data prior to queuing, retransmissions will not be required. Accordingly, the amount of queued data is reduced resulting in lower data latency. Additionally, since the rerouted data is never queued, the duplication of data as experienced in the prior art is eliminated.

A prioritization scheme 72 for use with a FACH 58 is shown in FIG. 5. Since the DSCH, H-ARQ of the MAC-sh have mandatory shared control data, they have the highest priority, highest. Although the H-ARQ of the MAC-d has mandatory control data, being dedicated it is assigned a slightly lower priority, high. The CCCH and DCCH are used for signaling and have the next level of priority, medium. The lowest level of priority is assigned to the DTCH because it has best effort dedicated traffic data.

Figure 1:
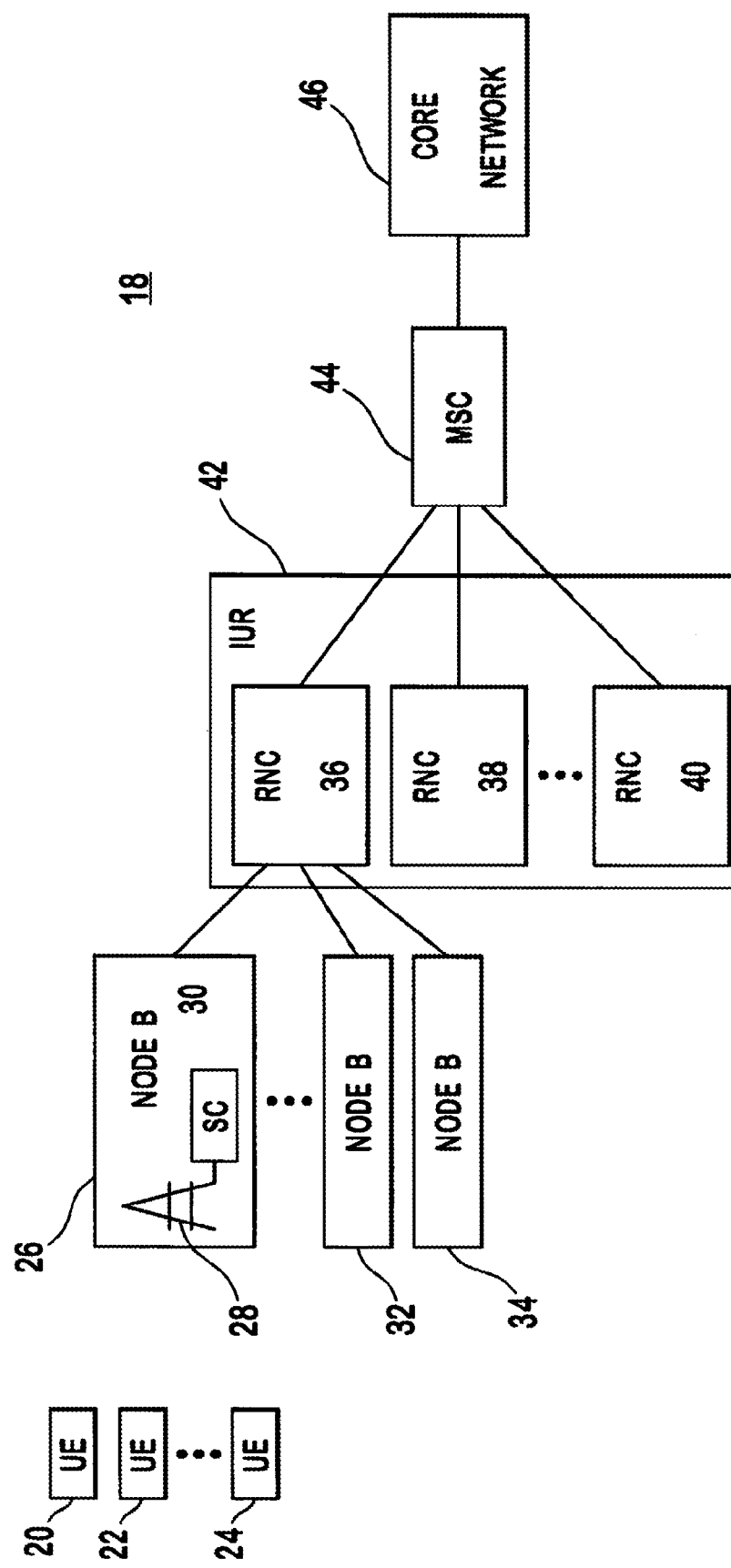
FIG. 1 is a simplified illustration of a wireless spread spectrum communication system.
Figure 2:
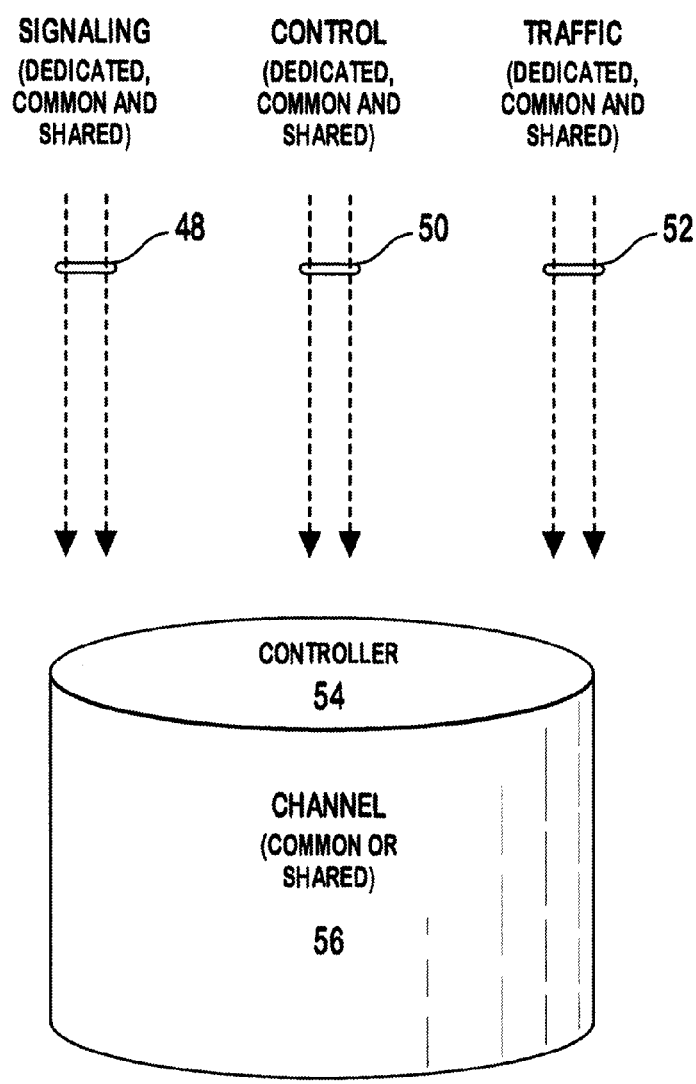
FIG. 2 is an illustration of data flowing into a common or shared channel.
Figure 3:
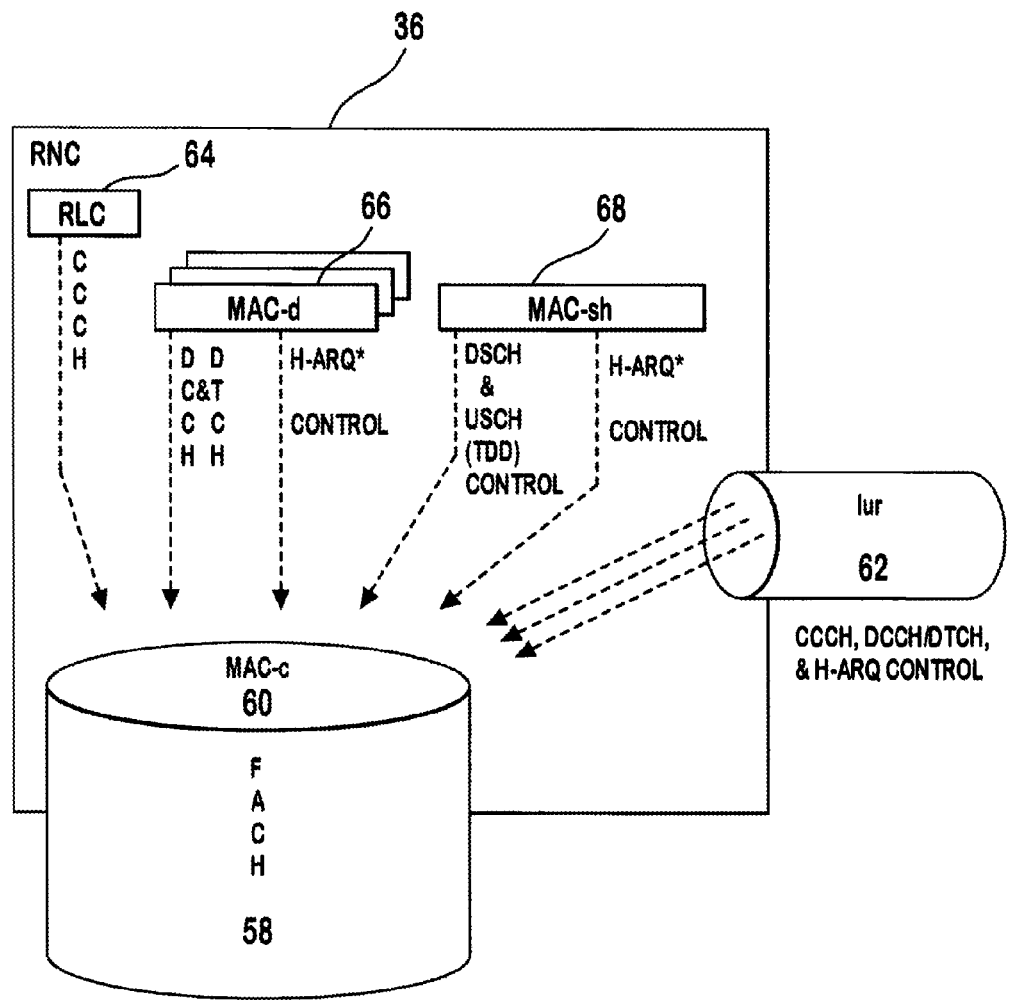
FIG. 3 is an illustration of data flowing into a FACH channel within an RNC.

To facilitate this prioritization scheme 72 for the FACH 58, modifications to the RNC 36 are required. As shown in FIG. 3, the prior art MAC-d 66 controls the DCCH, DTCH and MAC-d's H-ARQ. As shown in FIG. 5, each of these sources has a different priority. Since this data is multiplexed prior to prioritization at the MAC-d 66, the multiplexer of the MAC-d 66 is moved to the MAC-c 60 to allow prioritization at the MAC-c 60. Alternatively, the MAC-d 66 may send the priority and class (mandatory or best effort), such as by a flag or identifier, of each packet of the multiplexed data for prioritization at the MAC-c 60. The data controlled by the RLC 64 and the MAC-sh 68 have equal priority and accordingly, neither requires modification. Using the stored priority list, the data from the various sources is scheduled for transmission and rerouted during periods of high congestion.

Figure 6:
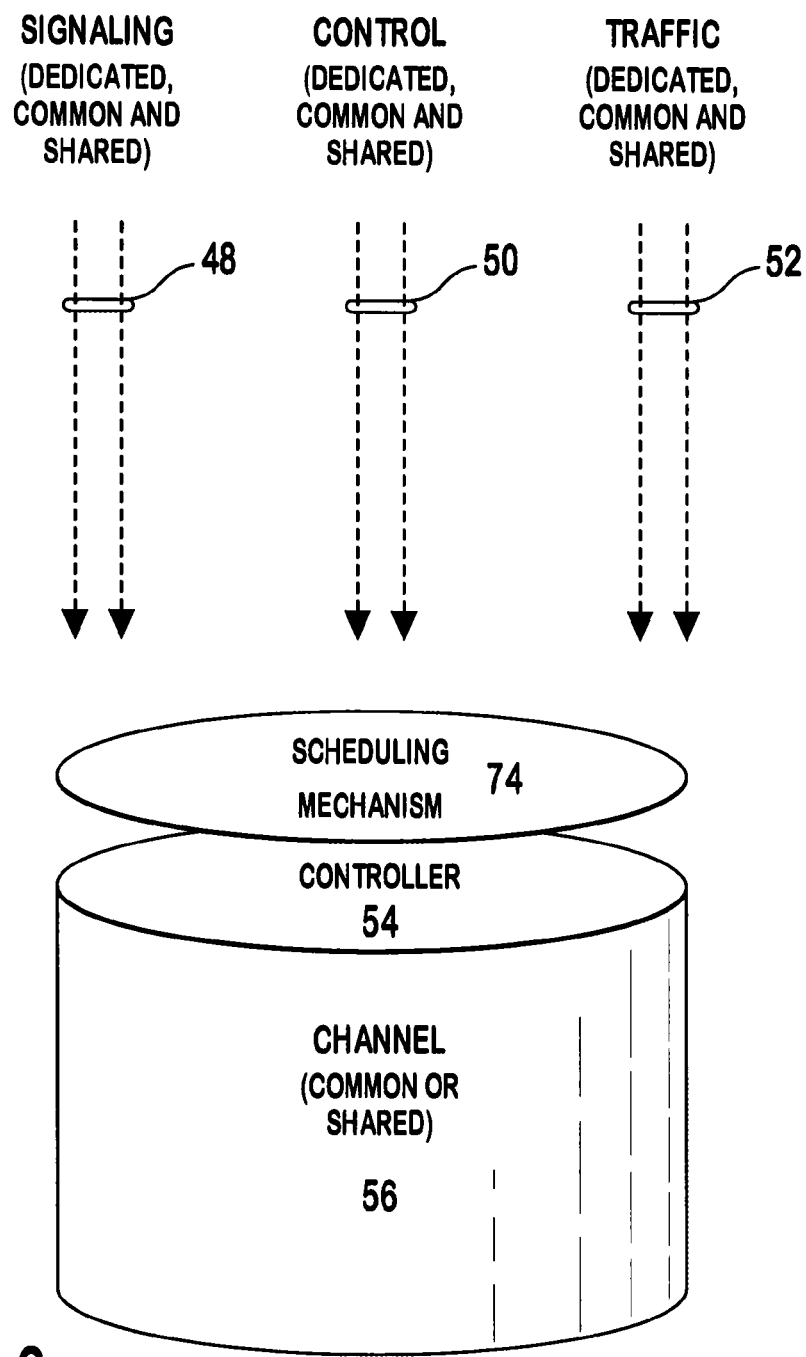
FIG. 6 depicts a reservation mechanism used with a common or shared channel.

Another technique for reducing the latency of data which may be combined with prioritization is to control the flow of data between the various controllers. As shown in FIG. 6, a scheduling mechanism 74 is used to regulate the data entering the common or shared channel 56. The scheduling mechanism 74 tracks the backlog of data in the controller's queue. If the mechanism 74 recognizes congestion and that the data will not be transmitted in a certain period of time, access to the channel 56 limits the flow of data from the individual data sources. The individual sources will recognize the need to reroute data or to not attempt transmission. Using a flow control mechanism with a FACH, MAC and RLC (Layer 2), the latency of signaling is decreased thus increasing efficiency.

Figure 7:
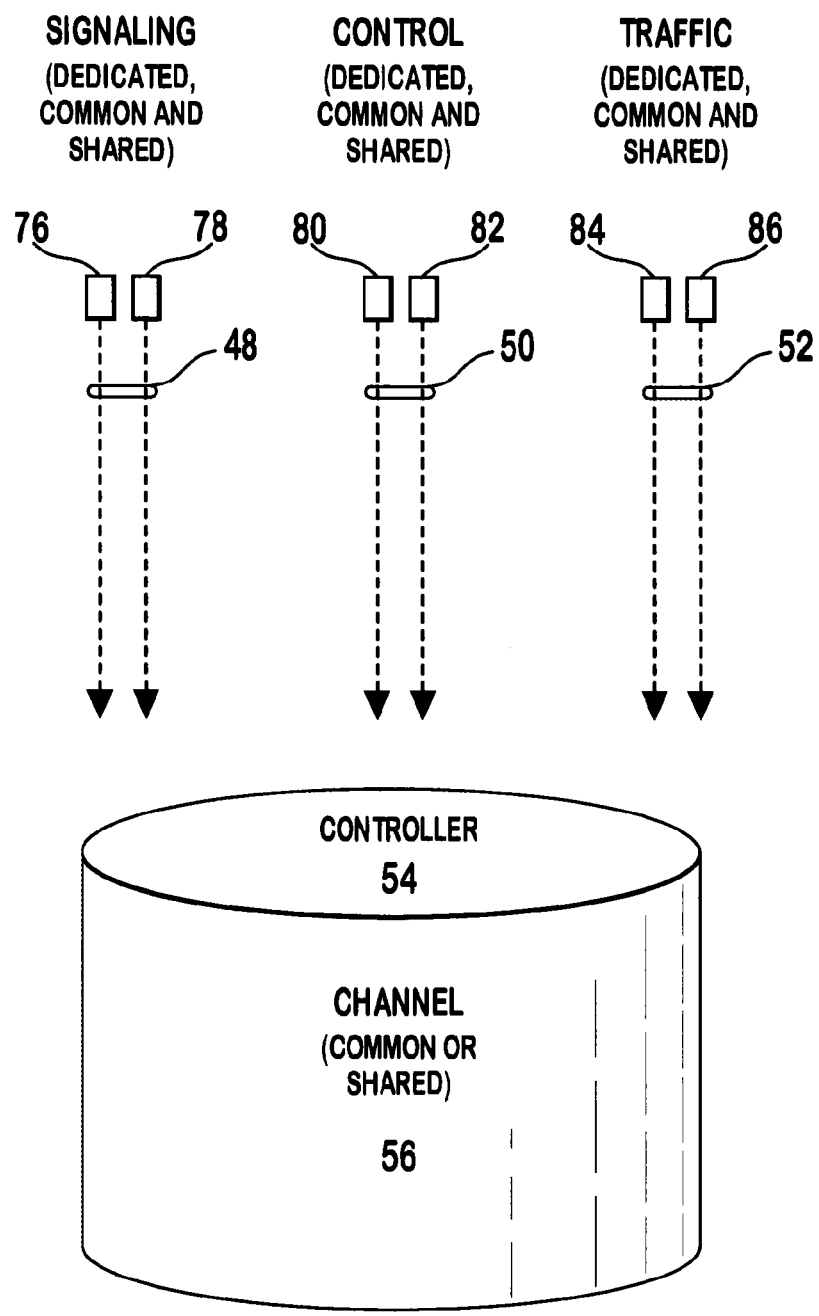
FIG. 7 depicts data source windows used with a common or shared channel.

To prevent the monopolization of the common or shared channel 56 by one data source 48-52 variable windows 76-86 may be used as shown in FIG. 7. Each data source 48-52 has a window or multiple windows 76-86 of outstanding data in the queue that it is permitted. The size of the window 76 is based on the requirements of the specific source. The window 76 is dynamically adjusted in response to the availability of the queue. As the availability of the channel increases, the size of the windows increase which increases the number of outstanding packets. Conversely, as the availability decreases, the size of the windows decrease which decreases the number of outstanding packets. As a result of the decreased windows, the data sources either reroute or stop sending packets to the windows.

What is claimed is:

1. A wireless communication apparatus comprising:
   a queue and circuitry configured to
   produce data for a plurality of channels including at least one common control channel (CCCH), at least one dedicated control channel (DCCH) and at least one dedicated traffic channel (DTCH), wherein each of the plurality of channels is associated with a priority and a dynamically adjusted parameter; and
   multiplex the data of the plurality of channels based on the priority for transmission over a shared channel, wherein hybrid automatic repeat request (H-ARQ) control information is multiplexed onto the shared channel.

2. The apparatus of claim 1 wherein the dynamically adjusted parameter indicates a size limit of an amount of data for multiplexing for that channel.

3. The apparatus of claim 2 wherein the size limit is based on requirements of the channel and the requirements of the plurality of channels differ.

4. The apparatus of claim 1 wherein the priority and the dynamically adjusted parameter prevents monopolization of the shared channel by one of the plurality of channels.

5. The apparatus of claim 1 wherein the H-ARQ control information is multiplexed regardless of the priority of the plurality of channels.

6. The apparatus of claim 1 wherein the priority is based on whether the data is best effort or not best effort.

7. The apparatus of claim 1 wherein each channel is associated with a dedicated traffic channel (DTCH).

8. A method for use in a wireless communication device comprising:
   producing data for a plurality of channels, wherein the plurality of channels include at least one common control channel (CCCH), at least one dedicated control channel (DCCH), and at least one dedicated traffic channel (DTCH), wherein each of the plurality of channels is associated with a priority and a dynamically adjusted parameter; and
   multiplexing the data of the plurality of channels based on the priority for transmission over a shared channel, wherein hybrid automatic repeat request (H-ARQ) control information is multiplexed onto the shared channel.

9. The method of claim 8 wherein the dynamically adjusted parameter indicates a size limit of an amount of data for multiplexing for that channel.

10. The method of claim 9 wherein the size limit is based on requirements of the channel and the requirements of the plurality of channels differ.

11. The method of claim 8 wherein the priority and the dynamically adjusted parameter prevents monopolization of the shared channel by one of the plurality of channels.

12. The method of claim 8 wherein the H-ARQ control information is multiplexed regardless of the priority of the plurality of channels.

13. The method of claim 8 wherein the priority is based on whether the data is best effort or not best effort.

14. The method of claim 8 wherein each channel is associated with a dedicated traffic channel (DTCH).

* * * * *